US009709851B2

(12) United States Patent
Seo et al.

(10) Patent No.: US 9,709,851 B2
(45) Date of Patent: Jul. 18, 2017

(54) IMAGE DISPLAY APPARATUS FOR DISPLAYING A 3D IMAGE

(71) Applicant: SAMSUNG DISPLAY CO., LTD., Yongin, Gyeonggi-Do (KR)

(72) Inventors: Hyunseung Seo, Anyang-si (KR); Kyungho Jung, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 366 days.

(21) Appl. No.: 14/604,322

(22) Filed: Jan. 23, 2015

(65) Prior Publication Data

US 2015/0286061 A1 Oct. 8, 2015

(30) Foreign Application Priority Data

Apr. 8, 2014 (KR) ........................ 10-2014-0041910

(51) Int. Cl.
*G02F 1/1335* (2006.01)
*G02F 1/13363* (2006.01)
*G02F 1/1343* (2006.01)
*G02B 27/22* (2006.01)
*G02F 1/29* (2006.01)
*G02F 1/1347* (2006.01)

(52) U.S. Cl.
CPC ..... *G02F 1/13363* (2013.01); *G02B 27/2214* (2013.01); *G02F 1/134309* (2013.01); *G02F 1/292* (2013.01); *G02F 1/1347* (2013.01)

(58) Field of Classification Search
CPC ........... G02F 1/13363; G02F 1/134309; G02B 27/2214
USPC .......................................................... 349/15
See application file for complete search history.

(56) References Cited

U.S. PATENT DOCUMENTS

| 6,046,849 A * | 4/2000 | Moseley .............. G02B 5/3016 348/57 |
| 8,531,646 B2 | 9/2013 | Shi et al. |
| 2010/0073768 A1* | 3/2010 | Kim .................... G02B 27/2214 359/463 |

FOREIGN PATENT DOCUMENTS

KR 10-2011-0104701 9/2011
KR 10-2014-0102035 8/2014
(Continued)

OTHER PUBLICATIONS

Lei Shi, et al., "Liquid Crystal Optical Phase Plate With a Variable In-Plane Gradient," Journal of Applied Physics 104, No. 3 (2008) pp. 033109-1-033109-7.

*Primary Examiner* — Lucy Chien
(74) *Attorney, Agent, or Firm* — F. Chau & Associates, LLC.

(57) ABSTRACT

An image display apparatus includes a display panel displaying an image. A switching panel activates a lenticular lens during a three-dimensional mode and deactivate the lenticular lens in a two-dimensional mode by arranging liquid crystal molecules thereof. A pattern retarder is disposed between the display panel and the switching panel and includes a first retarder part converting light emanating from the display panel to a first circularly polarized light and a second retarder part converting the light emanating from the display panel to a second circularly polarized light. The switching panel includes first and second areas respectively corresponding to the first and second retarder parts, and the liquid crystal molecules are rotated in a first direction in the first area and a second direction in the second area.

20 Claims, 10 Drawing Sheets

(56) References Cited

FOREIGN PATENT DOCUMENTS

KR  1020150048528  5/2015
KR  1020150051793  5/2015

* cited by examiner

IMAGE DISPLAY APPARATUS FOR DISPLAYING A 3D IMAGE

CROSS-REFERENCE TO RELATED APPLICATION

This patent application claims priority under 35 U.S.C. §119 to Korean Patent Application No. 10-2014-0041910, filed on Apr. 8, 2014, the contents of which are hereby incorporated by reference in its entirety.

TECHNICAL FIELD

The present disclosure relates to an image display apparatus. More particularly, the present disclosure relates to an image display apparatus capable of displaying a three-dimensional image.

DISCUSSION OF THE RELATED ART

An auto-stereoscopic display is a form of three-dimensional (3D) image display apparatus that displays a three-dimensional image without the use of 3D glasses. Auto-stereoscopic displays may use a parallax barrier scheme or a lenticular lens scheme.

A three-dimensional image display apparatus employing the parallax barrier scheme includes a parallax barrier, through which vertical lattice-shape openings are formed. The parallax barrier is disposed in front of a display panel including a set of pixels arranged in rows and columns. The parallax barrier blocks a right-eye image from being viewed by a viewer's left eye and blocks a left-eye image from being viewed by a viewer's right eye to generate a binocular disparity in different images.

A three-dimensional image display apparatus employing the lenticular lens scheme includes a lenticular lens sheet having a plurality of semi-cylindrical lenses arranged in a column direction and disposed on the display panel instead of the parallax barrier.

Auto-stereoscopic image display apparatuses may includes a switching panel switched between two- and three-dimensional modes. The switching panel includes two substrates, liquid crystals filled in between the two substrates, and electrodes disposed on one of the substrates to allow the liquid crystals to serve as the lenticular lens. The lenticular device switching panel is disposed in front of the display panel and switched between two-dimensional mode and three-dimensional mode by turning a voltage applied to the electrodes on and off.

SUMMARY

The present disclosure provides an image display apparatus capable of omitting a pre-tilt process in a switching panel to simplify a manufacturing process thereof.

Embodiments of the inventive concept provide an image display apparatus including a display panel that displays an image using a light. A switching panel controls liquid crystal molecules to display a two-dimensional image or a three-dimensional image on the display panel by allowing the liquid crystal molecules to be driven in a two-dimensional mode or a three-dimensional mode. A pattern retarder is disposed between the display panel and the switching panel. The pattern retarder including a first retarder part to convert the light exiting from the display panel to a first circularly polarized light and a second retarder part to convert the light exiting from the display panel to a second circularly polarized light.

The switching panel includes a first area corresponding to the first retarder part and a second area corresponding to the second retarder part. The liquid crystal molecules in the first area are rotated in a first direction and the liquid crystal molecules in the second area are rotated in a second direction that is opposite to the first direction.

According to the above, the liquid crystal molecules included in the switching panel may be aligned in a desired direction by controlling the shape of the electrodes included in the switching panel and the polarization of the pattern retarder. Therefore, the pre-tilting process needed to pre-tilt the liquid crystal molecules may be omitted, and thus the manufacturing process of the image display apparatus may be simplified.

BRIEF DESCRIPTION OF THE DRAWINGS

The above and other aspects of the present disclosure will become readily apparent by reference to the following detailed description when considered in conjunction with the accompanying drawings wherein.

DETAILED DESCRIPTION

It will be understood that when an element or layer is referred to as being "on", "connected to" or "coupled to" another element or layer, it can be directly on, connected or coupled to the other element or layer or intervening elements or layers may be present. Like numbers may refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below may be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms may be intended to encompass different orientations of the device in use or operation in addition to the orientation depicted in the figures.

Hereinafter, the present invention will be explained in detail with reference to the accompanying drawings.

Figure 1:
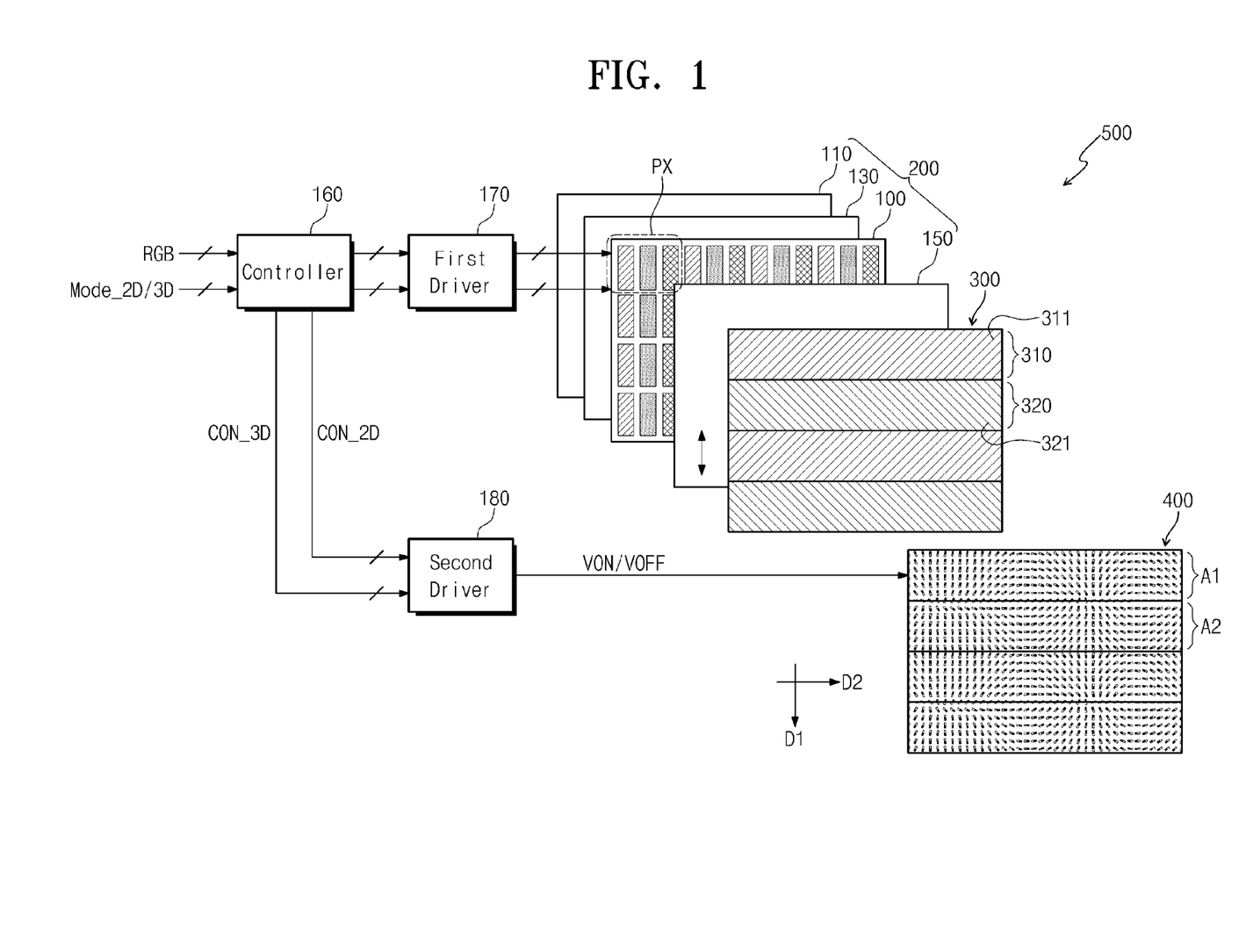
FIG. 1 is a block diagram showing an image display apparatus according to an exemplary embodiment of the present disclosure.

FIG. 1 is a block diagram showing an image display apparatus 500 according to an exemplary embodiment of the present disclosure.

Referring to FIG. 1, the image display apparatus 500 includes a display unit 200, a pattern retarder 300, and a switching panel 400.

The display unit 200 includes a display panel 100, a backlight unit 110, a controller 160, a first driver 170, and a second driver 180. The display panel 100 may be a flat display panel such as a liquid crystal display (LCD) panel, a plasma display panel, and an electroluminescence device (EL) such as an organic light emitting diode (OLED).

When the liquid crystal display panel is used as the display panel 100, the display unit 200 includes a backlight unit 110 disposed under the display panel 100, a lower polarizing film 130 disposed between the display panel 100 and the backlight unit 110, and an upper polarizing film 150 disposed between the display panel 100 and the pattern retarder 300. For the convenience of explanation, hereinafter, the liquid crystal display panel will be described as the display panel 100.

Although not shown in FIG. 1, the display panel 100 includes a lower substrate, an upper substrate, and a liquid crystal layer interposed between the lower substrate and the upper substrate. The lower substrate includes a plurality of pixels and the upper substrate includes red, green, and blue color filters disposed thereon to correspond to the pixels in a one-to-one correspondence.

The upper polarizing film 150 is attached to the upper substrate and the lower polarizing film 130 is attached to the lower substrate.

The display panel 100 displays a two-dimensional (hereinafter, referred to as 2D) image in response to a control of the controller 160 during a 2D mode and displays a three-dimensional (hereinafter, referred to as 3D) in response to the control of the controller 160 during a 3D mode.

Although not shown in FIG. 1, the first driver 170 includes a data driving circuit to apply data voltages to data lines of the display panel 100 and a gate driving circuit to sequentially apply gate signals to gate lines of the display panel 100. The data driving circuit converts digital video data, which have a 3D data format and are provided from the controller 160 in the 3D mode, to analog gamma voltages and generates 3D data voltages. In addition, the data driving circuit converts digital video data, which have a 2D data format and provided from the controller 160 in the 2D mode, to analog gamma voltages and generates 2D data voltages.

The controller 160 controls the first driver 170 in response to 2D/3D mode selection signals Mode_2 D/3D provided from a user through a user interface or 2D/3D identification codes extracted from input image signals such that the display panel 100 is operated in the 2D mode or the 3D mode.

The controller 160 generates timing control signals to control an operation timing of the first driver 170 using timing signals, e.g., a vertical synchronization signal, a horizontal synchronization signal, a main clock, a data enable signal, etc. The controller 160 multiplies the timing control signals by a positive integer (N) to drive the first driver at a frame frequency of about N×60 Hz, e.g., a frequency of about 120 Hz two times greater than an input frame frequency.

The backlight unit 110 includes at least one light source and a plurality of optical members that converts light provided from the light source to a surface light source and provides the surface light source to the display panel 100. The light source may include one or more of a hot cathode fluorescent lamp (HCFL), a cold cathode fluorescent lamp (CCFL), an external electrode fluorescent lamp (EEFL), a flange focal length (FFL), and a light emitting diode. The optical members include a light guide plate, a diffusion plate, a prism sheet, and a diffusion sheet to improve surface uniformity of the light from the light source.

The pattern retarder 300 has a substrate or film shape and is attached to the upper polarizing film 150 by an adhesive. The pattern retarder 300 includes first and second retarder parts 310 and 320, which have light absorbing axes substantially perpendicular to each other to polarize the light for the 3D image. The first retarder part 310 transmits a first circularly polarized light component of the light incident thereto through the upper polarizing film 150 and the second retarder part 320 transmits a second circularly polarized light component of the light incident thereto through the upper polarizing film 150. As an example, the first retarder part 310 may include a polarizing filter that transmits a left-circularly polarized light and the second retarder part 320 may include a polarizing filter that transmits a right-circularly polarized light.

The first retarder part 310 includes a first phase retardation pattern 311, the second retarder part 320 includes a second phase retardation pattern 321, and the first and second phase retardation patterns 311 and 321 may be perpendicular to each other. In addition, the first and second phase retardation patterns 311 and 321 may be respectively inclined at angles of about +45 degrees and about −45 degrees with respect to the polarizing axis of the upper polarizing film 150.

The pattern retarder 300 transmits the light without polarizing the light for the 2D image.

The switching panel 400 includes a first substrate, a second substrate, and a liquid crystal layer interposed between the first and second substrates. Each of the first and second substrates may include an insulating material, e.g., glass, plastic, etc. The switching panel 400 may further include a polarizing film (not shown) attached to an outer surface of the switching panel 400.

In addition, the controller 160 applies a first control signal CON_2D, which controls the switching panel 400 to be operated in an off state during the 2D mode, and a second control signal CON_3D, which controls the switching panel 400 to be operated in an on state during the 3D mode, to the second driver 180.

The second driver 180 generates an on-voltage VON or an off-voltage VOFF in response to the first and second control signals CON_2D and CON_3D and applies the on- and off-voltages VON and VOFF to the switching panel 400. Accordingly, the switching panel 400 receives the off-voltage VOFF from the second driver 180 in the 2D mode, and thus the switching panel 400 is not operated as a Fresnel lens during the 2D mode. The switching panel 400 receives the on-voltage VON from the second driver 180 in the 3D mode, and thus the switching panel 400 is operated as the Fresnel lens during the 3D mode.

The switching panel 400 transmits the image displayed in the display panel 100 during the 2D mode without separation in the visual field and separates the visual field of the image displayed in the display panel 100 during the 3D mode.

As shown in FIG. 1, liquid crystal molecules included in different areas of the switching panel 400 are rotated in different directions. In detail, the switching panel 300 includes a first area A1 corresponding to the first retarder part 310 and a second area A2 corresponding to the second retarder part 320, and the first and second areas A1 and A2 are alternately arranged in a first direction D1.

When viewed in a plan view, the liquid crystal molecules in the first area A1 of the switching panel 400 are rotated in a clockwise direction and the liquid crystal molecules in the second area A2 of the switching panel 400 are rotated in a counter-clockwise direction. The method of controlling the rotation directions of the liquid crystal molecules in the first and second areas A1 and A2 will be described in detail with reference to FIGS. 6 and 7.

Figure 2A:
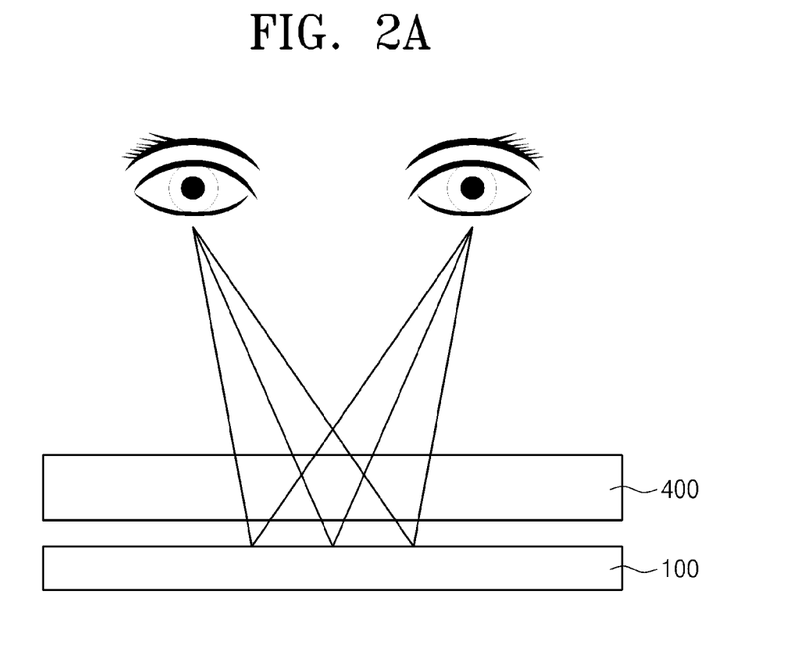
FIGS. 2A and 2B are views showing a method of forming two- and three-dimensional images of an image display apparatus according to an exemplary embodiment of the present disclosure.
Figure 2B:
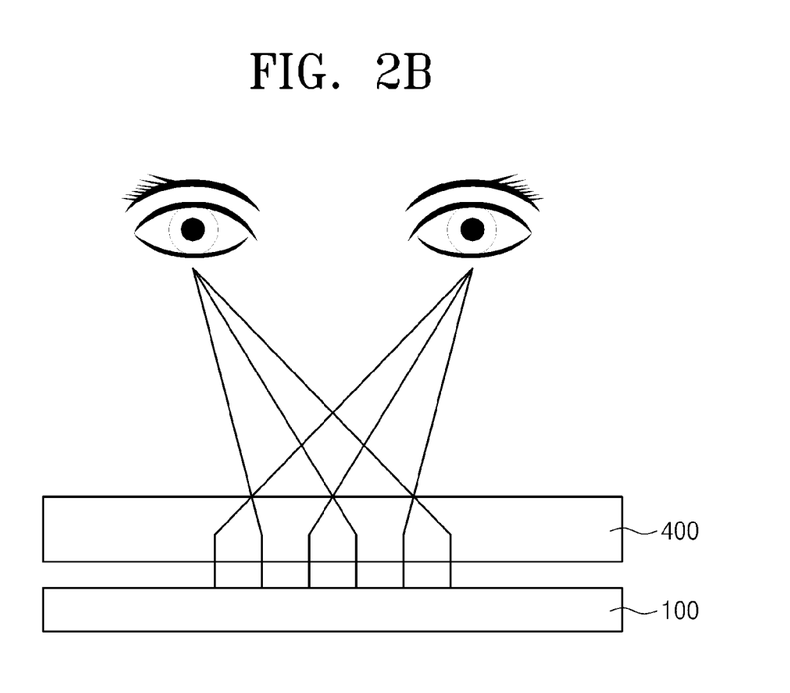

FIGS. 2A and 2B are views showing a method of forming the 2D and 3D images of the image display apparatus according to an exemplary embodiment of the present disclosure. For the convenience of explanation, FIGS. 2A and 2B show only the display panel 100 and the switching panel 400 of the image display apparatus shown in FIG. 1.

Referring to FIGS. 2A and 2B, the display panel 100 displays one plane image in the 2D mode, but alternately displays images corresponding to various visual fields, such as aright-eye image, a left-eye image, etc., through spatial- and time-division-multiplexing schemes in the 3D mode. For instance, the display panel 100 alternately displays the right-eye image and the left-eye image every pixel in one column during the 3D mode.

The switching panel 400 transmits the image displayed in the display panel 100 during the 2D mode without separation in the visual field and separates the visual field of the image displayed in the display panel 100 during the 3D mode. For example, the switching panel 400 operated in the 3D mode includes the left-eye image and the right-eye image, which are displayed in the display panel 100. Thus, a viewpoint image falls on a corresponding visual field in each viewpoint by using refraction and diffraction of the light.

FIG. 2A shows the display panel 100 and the switching panel 400, which are operated in the 2D mode. In this case, the same image is applied to the left and right eyes of the user, and thus the user recognizes the 2D image. FIG. 2B shows the display panel 100 and the switching panel 400, which are operated in the 3D mode. In this case, the switching panel 400 separates the image into the each visual field for the left and right eyes, and thus the user recognizes the 3D image.

Figure 3:
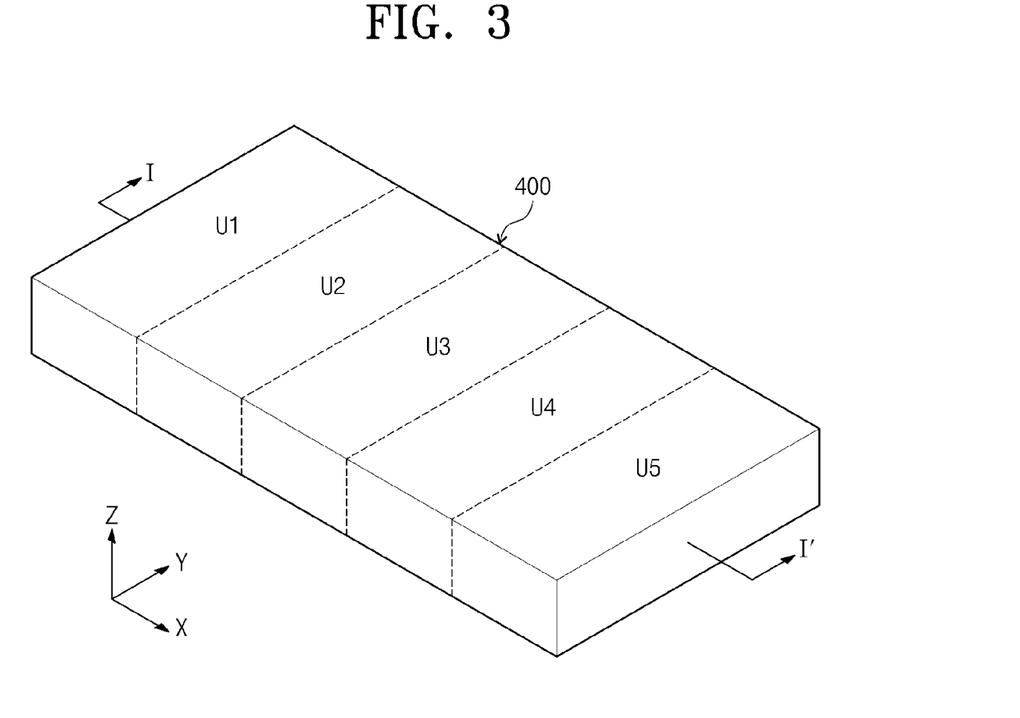
FIG. 3 is a perspective view showing a switching panel of an image display apparatus according to an exemplary embodiment of the present disclosure.
Figure 4:
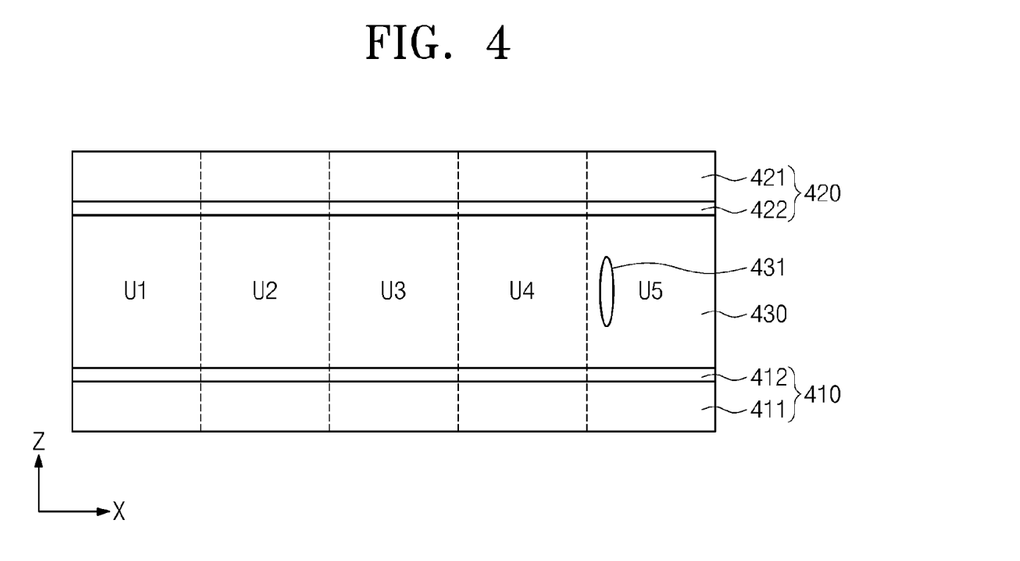
FIG. 4 is a cross-sectional view taken along a line I-I' of FIG. 3 to show the switching panel.

FIG. 3 is a perspective view showing the switching panel of the image display apparatus according to an exemplary embodiment of the present disclosure and FIG. 4 is a cross-sectional view taken along a line I-I' of FIG. 3 to show the switching panel.

Referring to FIGS. 3 and 4, the switching panel 400 includes a plurality of unit devices U1 to U5 sequentially arranged in an x-axis direction. Each of the unit devices U1 to U5 covers N viewpoints (N is a natural number), and one viewpoint corresponds to one pixel. In the present exemplary embodiment, each of the unit devices U1 to U5 covers nine viewpoints.

The switching panel 400 includes the first substrate 410, the second substrate 420, and the liquid crystal layer 430 interposed between the first and second substrates 410 and 420. The first substrate 410 includes a first base substrate 411 and a first electrode layer 412 disposed on the first base substrate 411. The second substrate 420 includes a second base substrate 421 and a second electrode layer 422 disposed on the second substrate 421. The first and second electrode layers 412 and 422 include a transparent conductive material, such as indium tin oxide (ITO), indium zinc oxide (IZO), etc.

One of the first and second electrode layers 412 and 422 may be patterned such that plural electrodes are disposed in each of the unit devices U1 to U5 and the other of the first and second electrode layers 412 and 422 may be integrally formed as a single unitary and individual unit.

The liquid crystal layer 430 includes negative vertical alignment liquid crystal molecules. The first and second electrode layers 412 and 422 form an electric field in the liquid crystal layer 430 in response to voltages respectively applied thereto to control the alignment of the liquid crystal molecules 431 of the liquid crystal layer 430. The switching panel 400 is operated in the 2D or 3D mode in accordance with the voltages respectively applied to the first and second electrode layers 412 and 422. For instance, when the off-voltage VOFF is applied to the first and second electrode layers 412 and 422, the switching panel 400 is operated in the 2D mode, and when the on-voltage VON is applied to the first and second electrode layers 412 and 422, the switching panel 400 is operated in the 3D mode.

Figure 5:
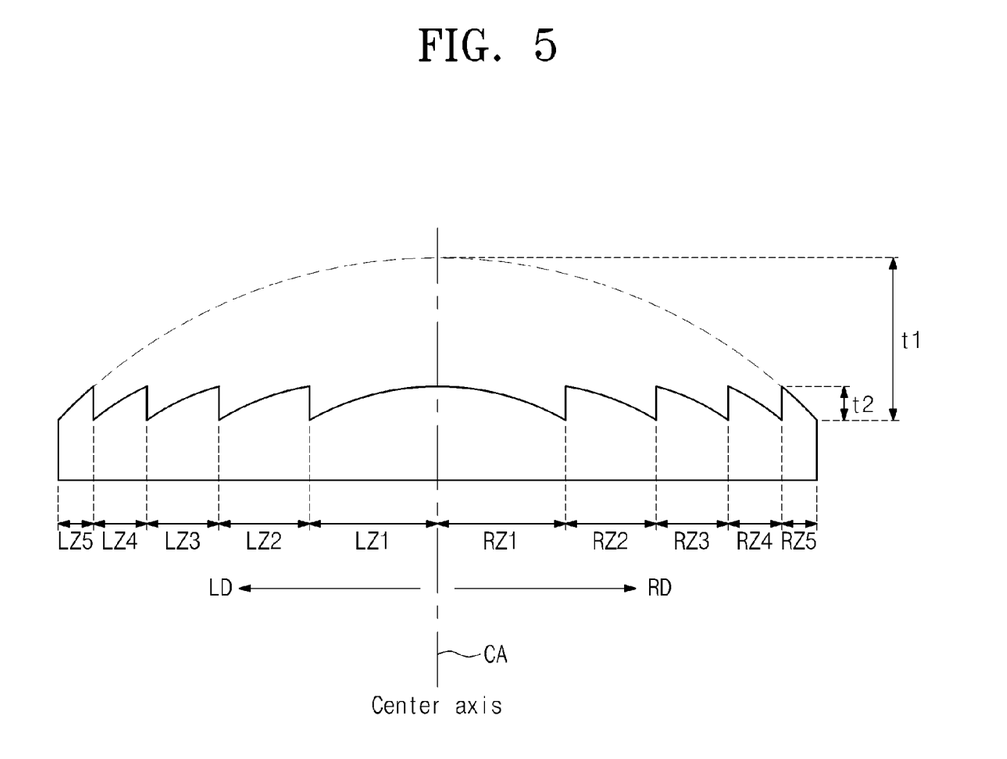
FIG. 5 is a view showing shape and phase retardation of a unit device shown in FIG. 3.

FIG. 5 is a view showing shape and phase retardation of the unit device shown in FIG. 3. In the present exemplary embodiment, since the unit devices U1 to U5 have the same structure and function, only one unit device will be described in detail with reference to FIG. 5 and details of the others will be omitted.

Referring to FIGS. 3 and 5, the switching panel 400 includes the unit devices U1 to U5. The unit devices U1 to U5 are repeatedly arranged in the x-axis direction of the switching panel 400. In the switching panel 400, positions of the unit devices U1 to U5 may be fixed to specific positions or changed in accordance with a time lapse.

When the switching panel 400 is operated in the 3D mode, the liquid crystal molecules are tilted in each unit device U1 to U5, and thus each unit device U1 to U5 causes a variation in phase difference as the Fresnel lens. In detail, each of the unit devices U1 to U5 may include a plurality of refraction areas by dividing an ideal phase retardation surface for each unit device U1 to U5 into plural phase retardation surfaces having the same curvature. Accordingly, when the switching panel 400 is operated in the 3D mode, the phase retardation surface is formed in each refraction area and discontinuities in phase exist between the refraction areas. For instance, the ideal phase retardation surface may be the surface having a convex lens shape, a spherical lens shape, or a hybrid lens shape.

When the ideal phase retardation surface is the convex lens, each unit device is realized in the shape of the Fresnel lens having a second thickness t2 by taking the phase retardation surface of the convex lens having a first thickness t1 greater than the second thickness t2 into consideration. Therefore, when the switching panel 400 is operated such that each unit device U1 to U5 is realized in the shape of the Fresnel lens, a cell gap of the switching panel 400 may be reduced by 1/K compared to that of the switching panel 400 when each unit device U1 to U5 is realized in the shape of the convex lens. Here, when assuming that the number of circular arcs in the shape of the Fresnel lens is "n", "K" is a positive integer corresponding to "n/2".

As described above, each of the unit devices U1 to U5 may be divided into the refraction areas RZ1, RZ2, RZ3, RZ4, RZ5, LZ1, LZ2, LZ3, LZ4, and LZ5. Among the refraction areas RZ1, RZ2, RZ3, RZ4, RZ5, LZ1, LZ2, LZ3, LZ4, and LZ5, the refraction areas disposed at a right side of a center axis CA are referred to as right-side refraction areas RZ1, RZ2, RZ3, RZ4, and RZ5 and the refraction areas disposed at a left side of the center axis CA are referred to as left-side refraction areas LZ1, LZ2, LZ3, LZ4, and LZ5.

Each of the refraction areas RZ1, RZ2, RZ3, RZ4, RZ5, LZ1, LZ2, LZ3, LZ4, and LZ5 may form the same phase retardation surface as the curvature of each of concentric circles, in which a distance is decreased as a distance from the center axis CA is increased.

In addition, a width (hereinafter, referred to as a pitch) of the right-side refraction areas RZ1, RZ2, RZ3, RZ4, and RZ5 is decreased as the distance from the center axis CA is increased along a right-side direction RD. A pitch of the left-side refraction areas LZ1, LZ2, LZ3, LZ4, and LZ5 is decreased as the distance from the center axis CA is increased along a left-side direction LD opposite to the right-side direction RD.

As an example, FIG. 5 shows five right-side refraction areas and five left-side refraction areas, which are disposed at the right and left sides of the center axis CA, but the number of the refraction areas should not be limited thereto or thereby.

Each of the refraction areas RZ1, RZ2, RZ3, RZ4, RZ5, LZ1, LZ2, LZ3, LZ4, and LZ5 of each unit device U1 to U5 has the shape in which the phase retardation is increased as it is closer to the center axis CA. In this case, each unit device U1 to U5 may refract the light passing therethrough to be condensed at a focus position using diffraction, extinction interference, and constructive interference of the light.

Figure 6:
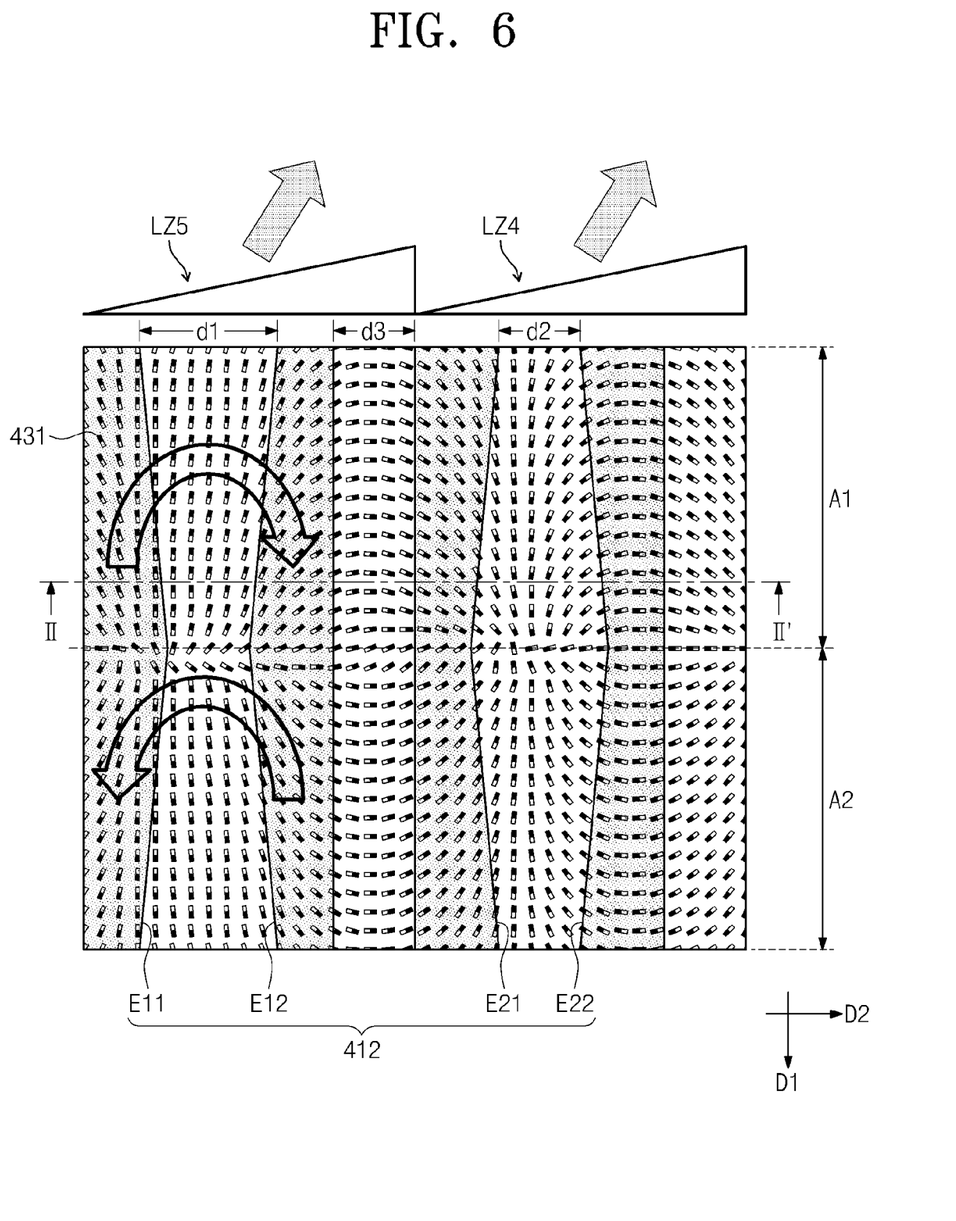
FIG. 6 is a plan view showing a first electrode layer corresponding to fourth and fifth left-side refraction areas shown in FIG. 5.
Figure 7:
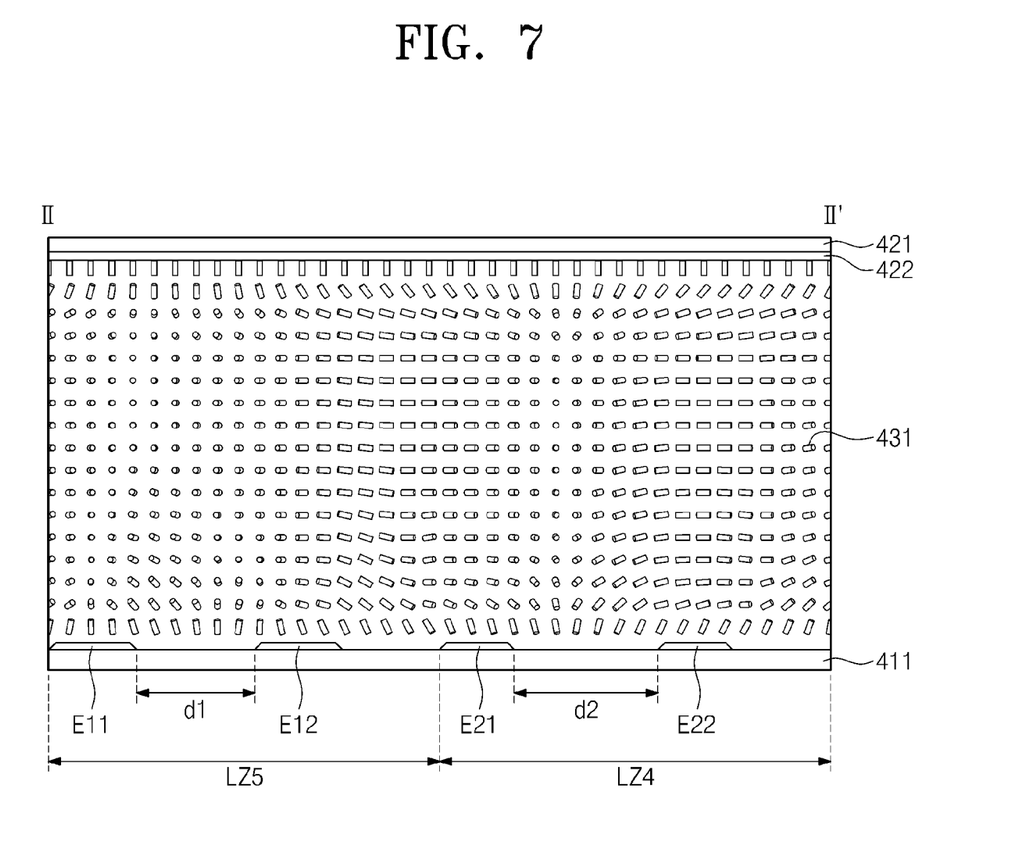
FIG. 7 is a cross-sectional view taken along a line II-II' of FIG. 6 showing the switching panel.

FIG. 6 is a plan view showing the first electrode layer corresponding to fourth and fifth left-side refraction areas shown in FIG. 5 and FIG. 7 is a cross-sectional view taken along a line II-II' of FIG. 6 to show the switching panel.

FIGS. 6 and 7 show the plane structure of the first electrode layer 412 disposed on the first base substrate 411 in the fourth and fifth left-side refraction areas LZ4 and LZ5. The first electrode layer 412 includes first and second electrodes E11 and E12 disposed in the fifth left-side refraction area LZ5 and third and fourth electrodes E21 and E22 disposed in the fourth left-side refraction area LZ4. For example, two electrodes applied with the voltages having the same electric potential are disposed in each refraction area LZ4 and LZ5.

The first to fourth electrodes E11, E12, E21, and E22 extend in the first direction D1 and are sequentially arranged in the second direction D2 substantially perpendicular to the first direction D1. Here, the refraction areas LZ4 and LZ5 are arranged in the second direction D2.

For the convenience of explanation, FIG. 6 shows one first area A1 and one second area A2, which are arranged in the first direction D1, but the number of the first and second areas A1 and A2 should not be limited thereto or thereby and the first and second areas A1 and A2 are alternately arranged in the first direction D1.

A first distance d1 between the first and second electrodes E11 and E12 in the fifth left-side refraction area LZ5 of the first area A1 decreases along the first direction D1 and the first distance d1 between the first and second electrodes E11 and E12 in the fifth left-side refraction area LZ5 of the second area A2 increases along the first direction D1. In addition, a second distance d2 between the third and fourth electrodes E21 and E22 in the fourth left-side refraction area LZ4 of the first area A1 increases along the first direction D1 and the second distance d2 between the third and fourth electrodes E21 and E22 in the fourth left-side refraction area LZ4 of the second area A2 decreases along the first direction D1. Thus, the first and second distances d1 and d2 may have a smallest value (a minimum value) (first case) at a boundary between the first and second areas A1 and A2 or a largest value (a maximum value) (second case) at the boundary between the first and second areas A1 and A2. The first and second distances d1 and d2 may correspond to different cases from each other at the same boundary. When the first distance d1 has the smallest value at the same boundary, the second distance d2 may have the largest value. A distance d3 between the second electrode E12 and the third electrode E21 may be constantly maintained.

When a length in the first direction D1 of the first to fourth electrodes E11 to E22, a minimum width of each of the first to fourth electrodes E11 to E22, and a maximum width of each of the first to fourth electrodes E11 to E22 are respectively referred to as 'L1', 'W11', and 'W12', a ratio of '|W12−W11|' to 'L1' may be set to a reference range from about 1/100 to about 2/100. Thus, the area and shape of each of the first to fourth electrodes E11 to E22 may be changed while the ratio is in the reference range.

As shown in FIG. 6, the liquid crystal molecules 431 are rotated in the clockwise direction in the first area A1 and rotated in the counter-clockwise direction in the second area A2 when viewed in a plan view.

The light, which is right-circularly polarized while passing through the first retarder part 310 (refer to FIG. 1), is incident to the first area A1, and the light, which is left-circularly polarized while passing through the second retarder part 320 (refer to FIG. 1), is incident to the second area A2. Accordingly, the light incident to the fourth and fifth left-side refraction areas LZ4 and LZ5 may be refracted to travel to the center axis CA (refer to FIG. 5) of each unit device U1 to U5 by the liquid crystal layer 430.

Although not shown in figures, the fourth and fifth right-side refraction areas RZ4 and RZ5 are disposed at the right side of the center axis CA and the first electrode layer 412 has a symmetrical shape with respect to the center axis CA. Therefore, the light incident to the fourth and fifth right-side refraction area RZ4 and RZ5 may be refracted to travel to the center axis CA (refer to FIG. 5) of each unit device U1 to U5 by the liquid crystal layer 430.

In FIGS. 6 and 7, only the fourth and fifth left-side refraction areas LZ4 and LZ5 have been described in detail, but the other left-side refraction areas may have substantially the same structure as that of the fourth and fifth left-side refraction areas LZ4 and LZ5.

Figure 8:
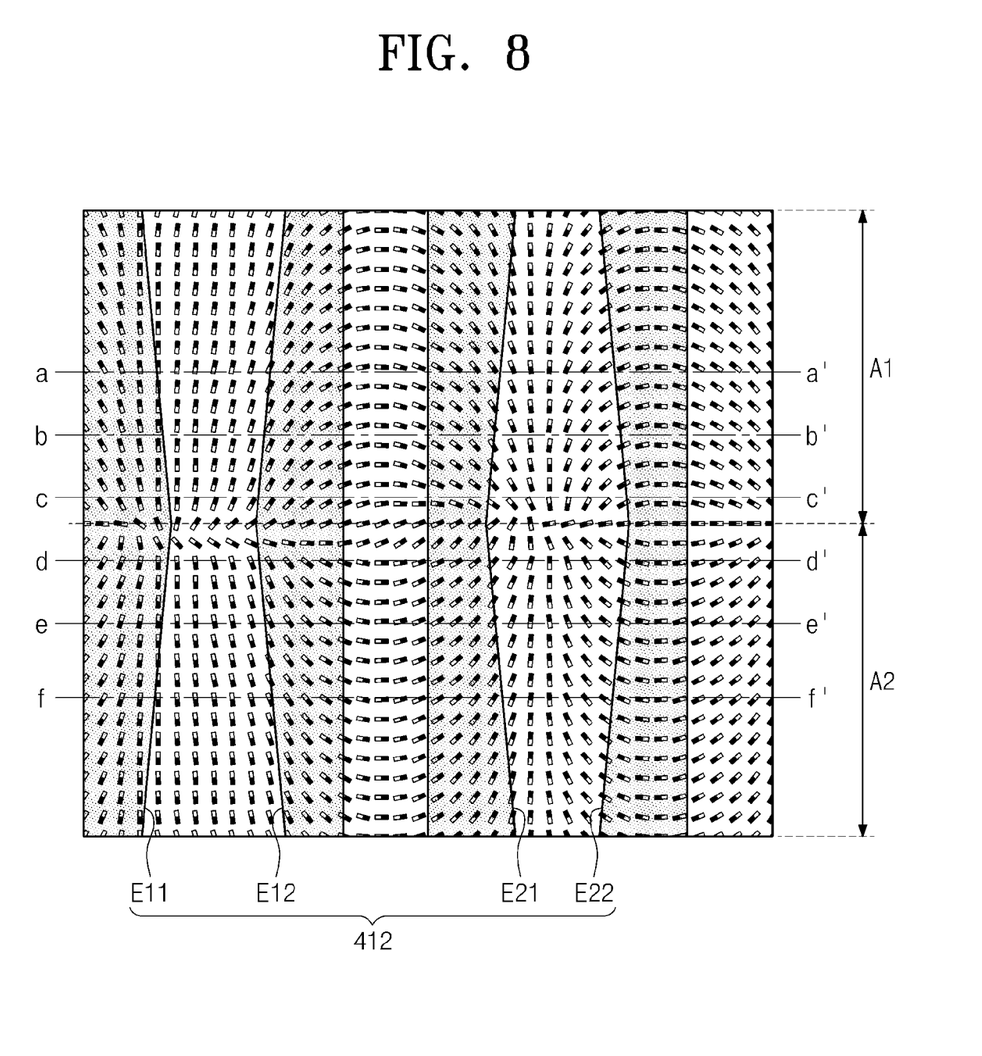
FIG. 8 is a plan view showing the first electrode layer shown in FIG. 6 at positions of a-a', b-b', c-c', d-d', e-e', and f-f'.

FIG. 8 is a plan view showing the first electrode layer shown in FIG. 6 at positions of a-a', b-b', c-c', d-d', e-e', and f-f'.

Referring to FIG. 8, the positions a-a', b-b', and c-c' of the first electrode layer 412 are located in the first area A1 and the positions d-d', e-e', and f-f' of the first electrode layer 412 are located in the second area A2. For example, the positions c-c' and d-d' are located adjacent to the boundary between the first area A1 and the second area A2.

Table 1 shown below represents diffraction efficiency (%) at the positions a-a', b-b', c-c', d-d', e-e', and f-f'.

TABLE 1

| Position | Diffraction efficiency (%) |
|---|---|
| a-a' | 92.81 |
| b-b' | 93.22 |
| c-c' | 92.71 |
| d-d' | 93.29 |
| e-e' | 95.23 |
| f-f' | 94.41 |

As represented by Table 1, the diffraction efficiency at six positions a-a', b-b', c-c', d-d', e-e', and f-f' of the first and second areas A1 and A2 is represented higher than about 92%.

In addition, each of the first, second, third, and fourth electrodes E11, E12, E21, and E22 has a symmetrical shape with respect to the boundary between the first and second areas A1 and A2. Therefore, the diffraction efficiency may be prevented from being rapidly lowered in the vicinity of the boundary.

Figure 9A:
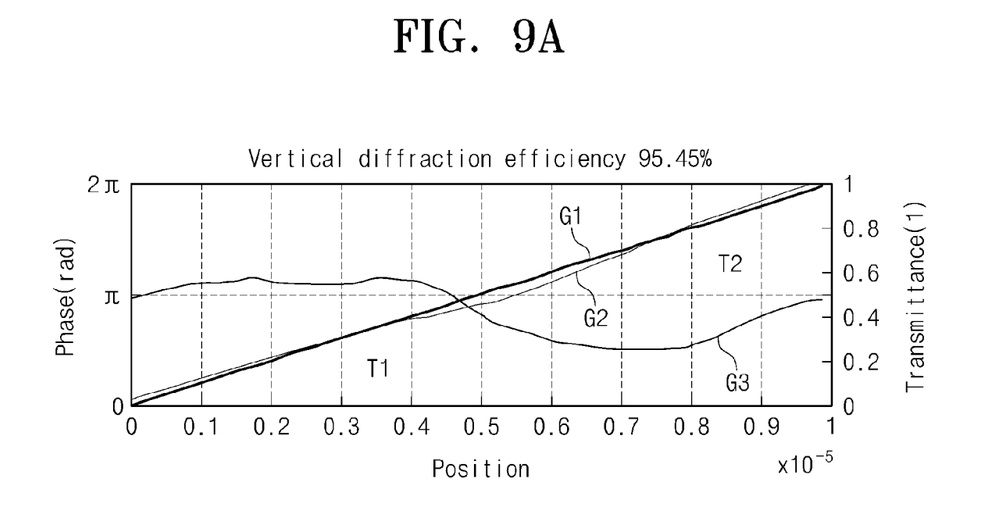
FIG. 9A is a graph showing a vertical diffraction efficiency and a transmittance at the position of a-a' of FIG. 8.
Figure 9B:
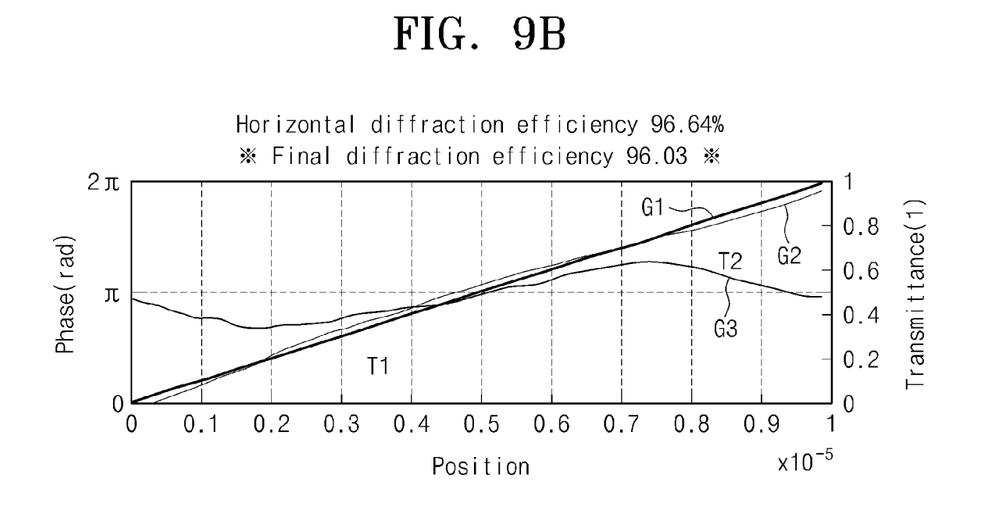
FIG. 9B is a graph showing a horizontal diffraction efficiency and a transmittance at the position of a-a' of FIG. 8.
Figure 10A:
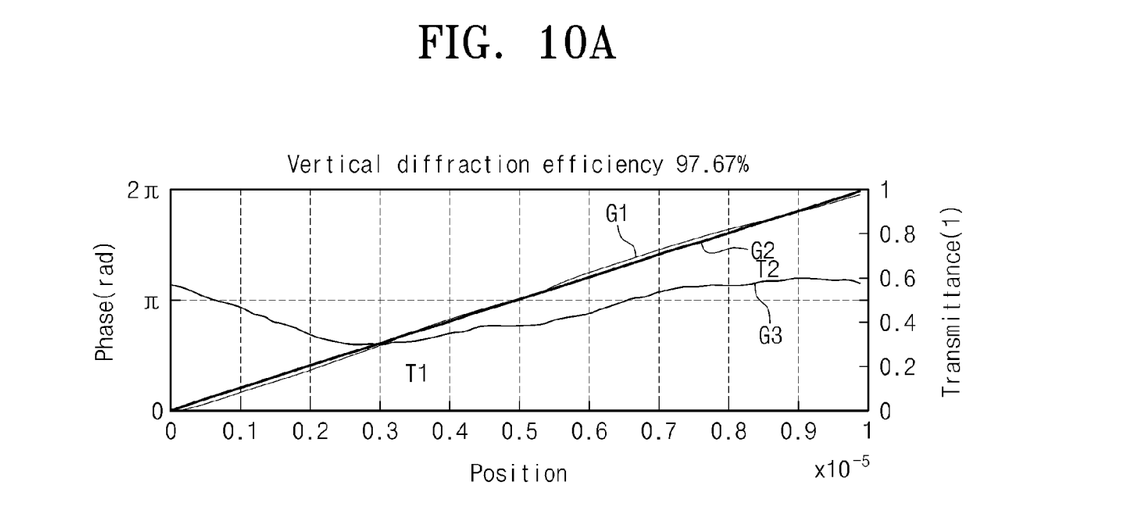
FIG. 10A is a graph showing a vertical diffraction efficiency and a transmittance at the position of f-f' of FIG. 8.
Figure 10B:
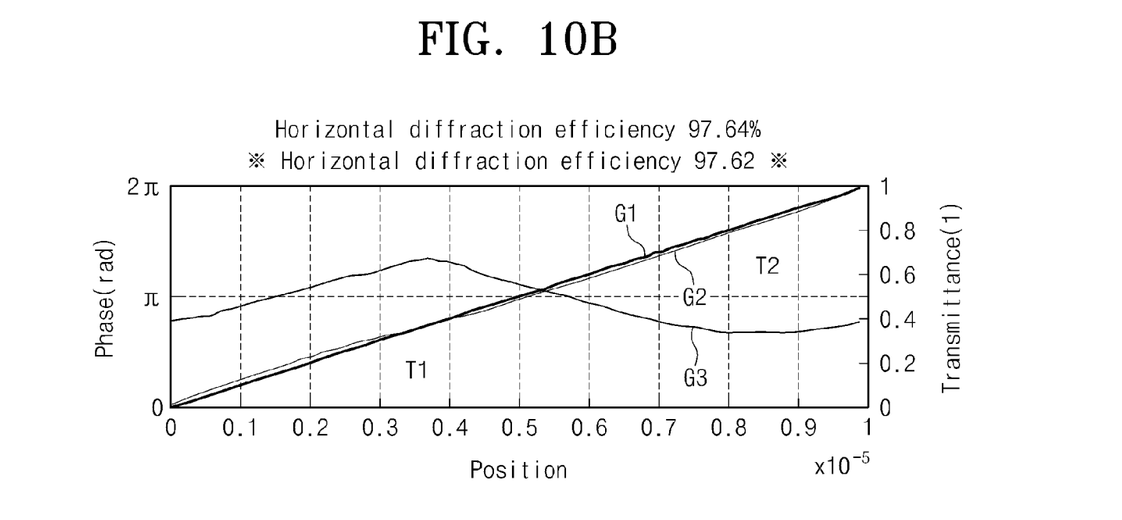
FIG. 10B is a graph showing a horizontal diffraction efficiency and a transmittance at the position of f-f' of FIG. 8.

FIG. 9A is a graph showing a vertical diffraction efficiency and a transmittance at the position a-a' of FIG. 8, FIG. 9B is a graph showing a horizontal diffraction efficiency and a transmittance at the position a-a' of FIG. 8, FIG. 10A is a graph showing a vertical diffraction efficiency and a transmittance at the position f-f' of FIG. 8, and FIG. 10B is a graph showing a horizontal diffraction efficiency and a transmittance at the position f-f' of FIG. 8.

The vertical diffraction efficiency of FIG. 9A represents the diffraction efficiency of vertical components of the left-circularly polarized light and the vertical diffraction efficiency of FIG. 9B represents the diffraction efficiency of horizontal components of the left-circularly polarized light. The vertical diffraction efficiency of FIG. 10A represents the diffraction efficiency of vertical components of the right-circularly polarized light and the vertical diffraction efficiency of FIG. 10B represents the diffraction efficiency of horizontal components of the right-circularly polarized light.

In FIGS. 9A, 9B, 10A, and 10B, a first graph G1 indicates a predetermined reference phase, a second graph G2 indicates an experimental phase, and a third graph G3 indicates a light transmittance.

Referring to FIGS. 9A and 9B, a range from about 0 to about 0.5 corresponds to one refraction area and a range from about 0.5 to about 1 corresponds to the other refraction area.

When a first triangular area T1 defined by the position in 0 to 0.5, the phase in 0 to π, and the first graph G1 is referred to as one refraction area and a second triangular area T2 defined by the position in 0.5 to 1, the phase in π to 2 π, and the first graph G1 is referred to as the other refraction area, an average value of the vertical diffraction efficiency in each area is represented at about 97.67% and an average value of the horizontal diffraction efficiency in each area is represented at about 97.64%.

Here, a final diffraction efficiency of the left-circularly polarized light may be about 96.62%. The final diffraction efficiency may be calculated by using the average values of the vertical diffraction efficiency and the horizontal diffraction efficiency and a weighted sum of the average value and the light transmittance.

Referring to FIGS. 10A and 10B, the average value the vertical diffraction efficiency in each refraction area is represented at about 95.45% and the average value of the horizontal diffraction efficiency in each refraction area is represented at about 96.64%. Here, a final diffraction efficiency of the right-circularly polarized light is represented at about 96.03%.

As described above, when the direction in which the light incident to the switching panel is polarized is set to match with the direction in which the liquid crystal molecules in the switching panel are rotated, the diffraction efficiency may be prevented from being lowered in the boundary between the first and second areas. In addition, the diffraction efficiency in each refraction area is represented at about 86%.

As described above, when the direction in which the light incident to the switching panel is polarized is set to match with the direction in which the liquid crystal molecules in the switching panel are rotated, the diffraction efficiency in each refraction area may be increased.

Figure 11:
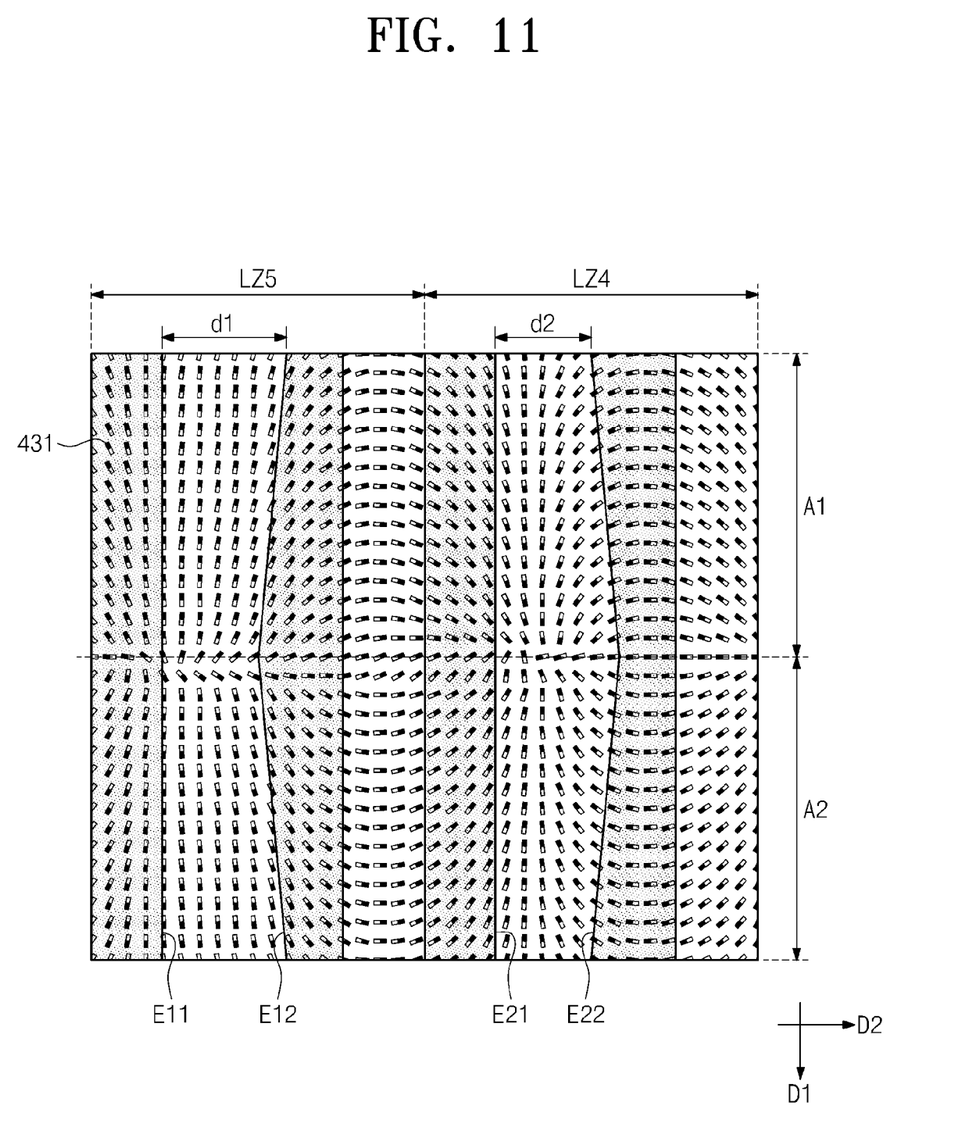
FIG. 11 is a plan view showing a first electrode layer according to an exemplary embodiment of the present disclosure.

FIG. 11 is a plan view showing a first electrode layer according to an exemplary embodiment of the present disclosure.

Referring to FIG. 11, a first electrode 412 includes first, second, third, and fourth electrodes E11, E12, E21, and E22. The first to fourth electrodes E11, E12, E21, and E22 extend in the first direction D1. The first and third electrodes E11 and E21 have a constant width in the second direction D2 and the second and fourth electrodes E12 and E22 have a width that varies in accordance with positions in the first direction D1.

In detail, the width of the second electrode E12 increases along the first direction D1 in the first area A1 and decreases along the first direction D1 in the second area A2. Accordingly, a first distance d1 between the first and second electrodes E11 and E12 decreases along the first direction D1 in the first area A1 and increases along the first direction D1 in the second area A2.

The width of the fourth electrode E22 decreases along the first direction D1 in the first area A1 and increases along the first direction D1 in the second area A2. Accordingly, a second distance d2 between the third and fourth electrodes E21 and E22 increases along the first direction D1 in the first area A1 and decreases along the first direction D1 in the second area A2.

In FIG. 11, the width of the first and third electrodes E11 and E21 is constant and the width of the second and fourth electrodes E12 and E22 is varied. According to embodiments, however, the width of the second and fourth electrodes E12 and E22 may be constant and the width of the first and third electrodes E11 and E21 may be varied.

Although the exemplary embodiments of the present invention have been described, it is understood that the present invention should not be limited to these exemplary embodiments but various changes and modifications can be made by one ordinary skilled in the art within the spirit and scope of the present invention.

What is claimed is:

1. An image display apparatus comprising:
a display panel that displays an image;

a switching panel configured to activate a lenticular lens during a three-dimensional mode and to deactivate the lenticular lens in a two-dimensional mode by arranging liquid crystal molecules thereof; and a pattern retarder disposed between the display panel and the switching panel, the pattern retarder including a first retarder part configured to convert light emanating from the display panel to a first circularly polarized light and a second retarder part configured to convert the light emanating from the display panel to a second circularly polarized light, wherein the switching panel comprises a first area corresponding to the first retarder part and a second area corresponding to the second retarder part, and wherein the liquid crystal molecules are rotated in a first direction in the first area and the liquid crystal molecules are rotated in a second direction opposite to the first direction in the second area.

2. The image display apparatus of claim 1, wherein the first direction is a clockwise direction, the second direction is a counter-clockwise direction, the first circularly polarized light is a right-circularly polarized light, and the second circularly polarized light is a left-circularly polarized.

3. The image display apparatus of claim 1, wherein the switching panel comprises:
a first substrate;
a second substrate facing the first substrate;
a first electrode layer disposed on the first substrate;
a second electrode layer disposed on the second substrate; and
a liquid crystal layer interposed between the first and second substrates and including the liquid crystal molecules therein.

4. The image display apparatus of claim 3, wherein the first and second areas are alternately arranged with each other in a third direction, and the first electrode layer comprises first, second, third, and fourth electrodes arranged in a fourth direction substantially perpendicular to the third direction.

5. The image display apparatus of claim 4, wherein a first distance between the first and second electrodes decreases along the third direction in the first area and a second distance between the third and fourth electrodes increases along the third direction in the first area.

6. The image display apparatus of claim 5, wherein a width of at least one of the first and second electrodes increases along the third direction in the first area and a width of at least one of the third and fourth electrodes decreases along the third direction in the first area.

7. The image display apparatus of claim 4, wherein a first distance between the first and second electrodes increases along the third direction in the second area and a second distance between the third and fourth electrodes decreases along the third direction in the second area.

8. The image display apparatus of claim 7, wherein a width of at least one of the first and second electrodes decreases along the third direction in the second area and a width of at least one of the third and fourth electrodes increases along the third direction in the second area.

9. The image display apparatus of claim 4, wherein a third distance between the second and third electrodes is constant.

10. The image display apparatus of claim 3, wherein the switching panel is operated in the two-dimensional mode when no voltage is applied to between the first and second electrode layers and the switching panel is operated in the three-dimensional mode when the voltage is applied to between the first and second electrode layers.

11. The image display apparatus of claim 3, wherein the switching panel comprises a plurality of unit devices provided between the first and second electrode layers in the three-dimensional mode, and each of the unit devices comprises a plurality of refraction areas.

12. The image display apparatus of claim 11, wherein the first and second areas are alternately arranged with each other in a third direction and the refraction areas are arranged in a forth direction substantially perpendicular to the third direction.

13. The image display apparatus of claim 11, wherein a pitch of the refraction areas is decreases as a distance from a center axis of each unit device is increased.

14. The image display apparatus of claim 13, wherein the first electrode layer in left-side refraction areas, which are disposed at a left side of the center axis, among the refraction areas has a symmetrical shape to that of the first electrode layer in right-side refraction areas, which are disposed at a right side of the center axis, among the refraction areas.

15. The image display apparatus of claim 3, wherein the liquid crystal molecules included in the liquid crystal layer are negative vertical alignment liquid crystal molecules.

16. The image display apparatus of claim 1, wherein the first retarder part comprises a first phase retardation pattern, the second retarder part comprises a second phase retardation pattern, and the first and second phase retardation patterns are substantially perpendicular to each other.

17. The image display apparatus of claim 16, further comprising a polarizing film interposed between the display panel and the pattern retarder, wherein the first and second phase retardation patterns are respectively inclined at angles of about +45 degrees and about −45 degrees with respect to a polarizing axis of the polarizing film.

18. An image display apparatus, comprising:
a display panel displaying an image;
a liquid-crystal switching panel disposed on the display panel and configured to selectively activate a lenticular lens, the switching panel comprising a first part and a second part; and
a pattern retarder disposed between the display panel and the switching panel,
wherein the pattern retarder includes a first polarizer part substantially aligned with the first part of the switching panel and a second polarizer part substantially aligned with the second part of the switching panel, and
wherein liquid crystal of the first part of the liquid crystal switching panel is configured to rotate in a first direction and liquid crystal of the second part of the liquid crystal switching panel is configured to rotate in a second direction opposite to the first direction.

19. The image display apparatus of claim 18, wherein the first and second polarizer parts are circular polarizers configured to circularly polarize light.

20. The image display apparatus of claim 18, wherein the switching panel activates the lenticular lens in a three-dimensional display mode of the display panel and deactivates the lenticular lens in a two-dimensional display mode of the display panel.

* * * * *